US006252548B1

(12) United States Patent
Jeon

(10) Patent No.: US 6,252,548 B1
(45) Date of Patent: Jun. 26, 2001

(54) TRANSCEIVER ARRANGEMENT FOR A SMART ANTENNA SYSTEM IN A MOBILE COMMUNICATION BASE STATION

(75) Inventor: Min Jeon, Sungnam (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/330,881

(22) Filed: Jun. 11, 1999

(30) Foreign Application Priority Data

Jun. 23, 1998 (KR) ................................................ 98-23623

(51) Int. Cl.[7] ........................................................ G01S 3/28

(52) U.S. Cl. ............................................................. 342/383

(58) Field of Search .................................... 342/383, 378, 342/372, 380

(56) References Cited

U.S. PATENT DOCUMENTS 4,309,769 * 1/1982 Taylor et al. ........................ 342/372
5,487,179 1/1996 Jan .
5,523,761 6/1996 Gildea .
5,610,617 3/1997 Gans .
5,659,886 8/1997 Noriaki .
5,771,017 6/1998 Stuart .
5,809,405 9/1998 Tomoya .

* cited by examiner

*Primary Examiner*—Daniel T. Pihulic
(74) *Attorney, Agent, or Firm*—Steve S. Cha; Klauber & Jackson

(57) ABSTRACT

A transceiver arrangement for a smart antenna system of a mobile communication base station is disclosed. A receiving apparatus comprises N array antennas, N AFEUs for down-converting each of signals which are received from the N array antennas into N different frequencies, respectively, N:1 power combiner for combining the converted N signals into one signal, a wideband transceiver for down-converting the combined signal into a base frequency band, a wide band analog-to-digital converter for converting the down-converted signal into a digital signal, N digital filters for dividing the digital signal into N different digital signals and L beam forming modules for receiving one by one the N digital signals divided by each of N digital dividing means and for forming adaptive beam, wherein L is the number of subscribers. A transmitting apparatus comprises L beam forming modules for L subscribers, N signal adders for adding N different signals provided by each of the beam forming modules, N digital modulators for up-converting the signal added by each of the signal adders into different frequencies, respectively, a digital signal combiner for combining signals modulated in the frequency by the N digital modulators into a digital signal, a wide band digital-to-analog converter for converting the digital signal combined by the digital signal combiner into a analog signal, a wide-band transceiver for up-converting in the frequency the analog signal converted by the wide band digital-to-analog converter, a 1:N power divider for dividing a output signal of the wide-band transceiver to N signals, equally, N antenna front-end units (AFEUs), each of AFEUS for converting one of the N signals divided by the 1:N power divider into a transmission frequency, and N array antennas for transmitting a signal from each of the antenna front-end units (AFEUs).

14 Claims, 5 Drawing Sheets

TRANSCEIVER ARRANGEMENT FOR A SMART ANTENNA SYSTEM IN A MOBILE COMMUNICATION BASE STATION

CLAIM OF PRIORITY

This application makes reference to, incorporates the same herein, and claims all benefits accruing under 35 U.S.C. §119 arising from an application entitled, A TRANSCEIVER FOR SMART ANTENNA SYSTEM OF MOBILE TELECOMMUNICATION BASE STATIONS, earlier filed in the Korean Industrial Property Office on Jun. 23, 1998, and there duly assigned Serial No. 1998-23623.

FIELD OF THE INVENTION

The present invention relates to a transceiver arrangement for a smart antenna system of a mobile communication base station. More particularly, the apparatus of the present invention which combines all the signals from an array of N antennas in accordance using frequency division multiplexing (FDM) and processes them with a wide-band transceiver, and sends all information from N antennas to beam forming modules in a base frequency band, allowing for adaptive beam forming.

DESCRIPTION OF THE RELATED ART

Generally, a term adaptive array is applied to a very intelligent or smart antenna. A smart antenna automatically changes its radiation patterns in response to its signal environments and directs an optimum directional beam in the direction by users and directs pattern nulls toward interference. A smart antenna receives signals and determines the beam direction needed to maximize SNIR (signal to noise ratio+interference) from the signals. Also, the smart antenna is capable of arbitrarily combining beams, selecting of a beam of having the strongest signal, dynamically pursuing for moving objects, removal of channel interference signals and making use of signals in all directions.

Smart antenna offers additional benefits such as high antenna gain, interference/multipath rejection, spatial diversity, good power efficiency, better range/coverage, increased capacity, higher bit rate, and lower power consumption.

On the other hand, smart antennas exhibit drawbacks that include requiring significant computation to identify optimum beam in a radio environment, so that it is difficult to perform a real time processing. In addition, hardware development for supporting the function of smart antennas tends to be a long and costly process.

In general, smart antenna systems include a sectored antenna, a diversity antenna, switched beam antenna and an adaptive array antenna.

Known smart antenna systems provides a basis for the next generation of a mobile communication systems in accordance with this invention to improve coverage and capacity over the conventional code division multiple access (CDMA) systems by forming an adaptive beam for each subscriber with using received signals from N array antennas, and improving signal to interference ratio (SIR) and signal to noise ratio (SNR) performance.

FIG. 1 illustrates a prior art structure of a smart antenna system of a mobile communication base station. The smart antenna system of FIG. 1 uses N array antennas and needs N transceivers, compared to a CDMA base station which does not use a smart antenna system.

As shown in the FIG. 1, N array antennas need N antenna front-end units (AFEUs), N high power amplifiers (HPAs) and N transceivers, respectively. Also, N analog-to-digital converters and N digital-to-analog converters. The N analog-to-digital converters and N digital-to-analog converters all must be connected to L beam forming modules in order to process L subscribers.

Prior art smart antenna system have drawbacks in that they require more transceivers and modules due to increasing of the number of antennas up to N, and they cause increased complexity of the system configuration, higher power consumption, higher fabrication costs, expansion of the system configuration, and increase of related cable requirement and they make physical configuration of the system difficult.

U.S. Pat. No. 5,610,617, entitled "Directive beam selectively for high speed wireless communication networks" (filed in Jul. 18, 1995 and published in Mar. 11, 1997) discloses another prior art system directed toward providing a technique for selecting a direct beam in a wireless communication network The prior art technique relies on Burtler matrix combiner circuit switching between a transmitter and an antenna array, and narrow beam width for selecting a transmission path having an optimum signal quality.

Such a prior art antenna array may have advantages such as reduction of power consumption, expansion of coverage range, improvements of the antenna array efficiency, and lower fabrication costs. However, such an array which chooses an optimal transmission path by means of switching between N array antennas and a transceiver is not suitable for forming adaptive beams.

SUMMARY OF THE INVENTION

Accordingly, it is an object of the present invention to provide a transceiver arrangement for a smart antenna system of a mobile communication base station for processing signals received from N array antennas with a single transceiver.

A receiving apparatus in accordance with the present invention comprises N array antennas, N means for down-converting each of the signals which are received from the N array antennas into a different frequency, respectively, means for combining the converted N signals into one signal, means for down-converting the combined signal into a base frequency band, means for converting the down-converted base frequency band signal into a digital signal, N digital dividing means for dividing the digital signal into N different signals and L beam forming modules for receiving one by one the N digital signals divided by each of N digital dividing means and for forming adaptive beam, wherein L is the number of subscribers.

A transmitting apparatus in accordance with the present invention comprises L beam forming modules having a respective weight for providing N different signals by multiplying each transmission signal by the weight, wherein L is the number of subscribers, N signal adders for adding N different signals provided by each of the beam forming modules, N digital modulators for up-converting the signal added by each of the signal adders into varying frequencies, respectively, a digital signal combiner for combining signals modulated frequency by the N digital modulators into a digital signal, a wide band digital-to-analog converter for converting the digital signal combined by the digital signal combiner into an analog signal, a wide-band transceiver for up-converting in the frequency the analog signal converted by the wide band digital-to-analog converter, a 1:N power divider for dividing an output signal of the wide-band transceiver into N signals, equally, N antenna front-end units (AFEUs), each of the AFEUS serving to convert one of the N signals divided by the 1:N power divider into a transmission frequency, and N array antennas for transmitting the signal from each of the antenna front-end units (AFEUs).

A transceiver arrangement of the present invention comprises N array antennas, N antenna front-end units for down-converting signals received from the N array antennas to N different intermediate band frequency or for up-converting N different intermediate band frequency signals into a radio transmission frequency, and then transmitting the up-converted radio transmission frequency via the N antennas, a N:1 power combiner for combining the down-converted N intermediate band frequency signals, a 1:N power divider for providing one of N different intermediate band frequency transmission signals to N antenna front-end units, respectively, a wide-band transceiver for down-converting a receiving signal combined by the N:1 power combiner into a base frequency band or for up-converting an analog transmission signal from the wide-band transceiver in the frequency to the 1:N power divider, a wide band analog-to-digital converter for converting a receiving signal down-converted by the wide-band transceiver into digital signals, N digital filters for dividing the converted digital signals into N different signals, a wide band digital-to-analog converter for converting a digital transmission signals into analog signals and for providing the converted analog signals to the wide-band transceiver, and beam forming module for forming an adaptive beam in receiving one of N digital receiving signals divided by the N digital filters in the receiving process or for multiplying each transmission signal by a weight and providing it with N signals divided in the transmitting process, wherein the number of the beam forming module is equal to the number of subscribers.

BRIEF DESCRIPTION OF THE DRAWINGS

The objects, features and advantages of the present invention will be made apparent to those skilled in this art by reference to the following detailed description and the accompanying drawings.

DETAILED DESCRIPTION OF THE INVENTION

Figure 1:
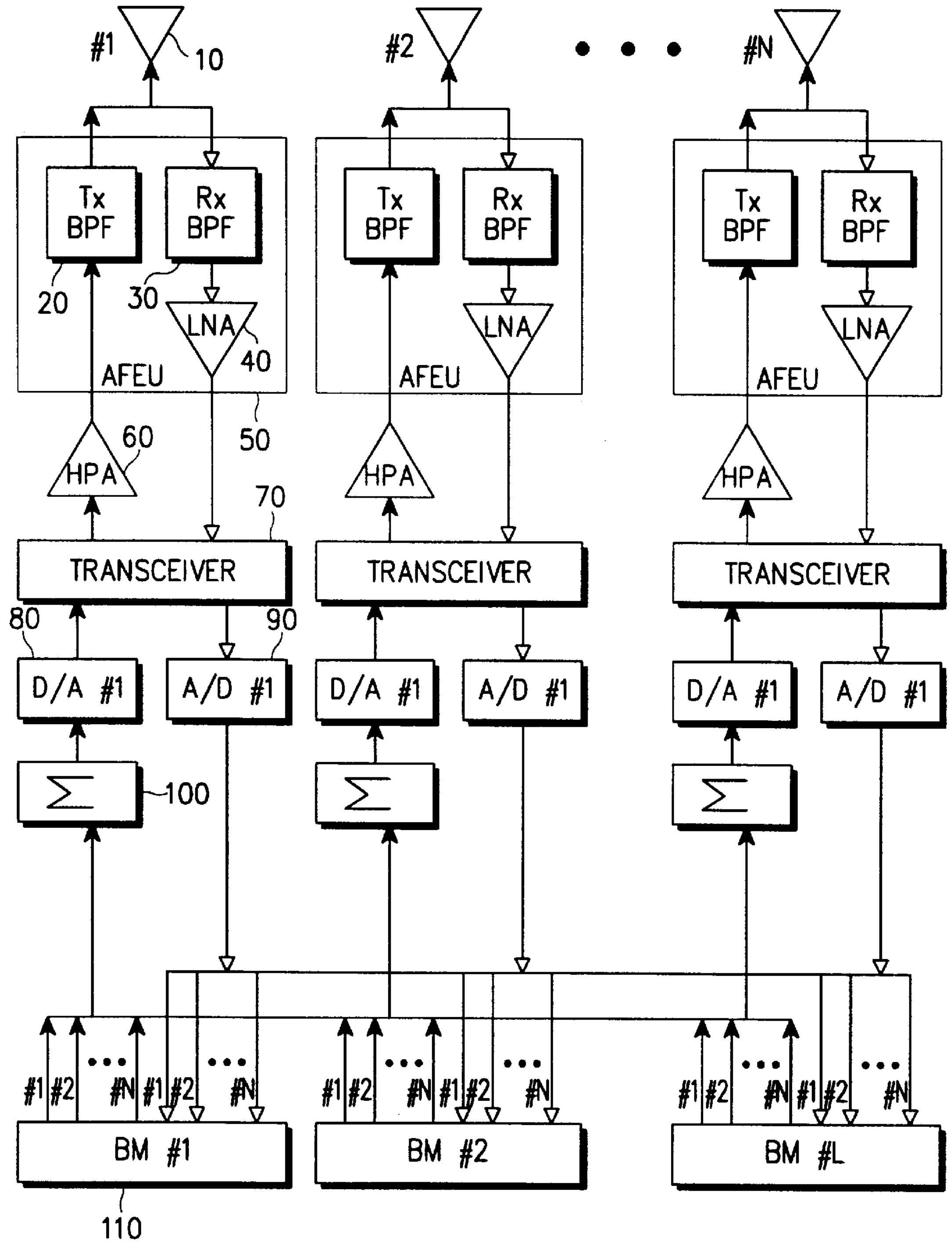
(PRIOR ART) FIG. 1
FIG. 1 illustrates a prior art structure of a smart antenna system of a mobile communication base station.

According to one embodiment of the present invention, a receiving apparatus for a smart antenna system of a mobile communication base station comprises N array antennas, N means for down-converting each signal which are received from the N array antennas into different frequency, respectively, means for combining the converted N signals into one signal, means for down-converting the combined signal into a base frequency band, means for converting the down-converted base frequency band signal into a digital signal, N digital dividing means for dividing the converted digital signal into N different digital signals and L beam forming modules for receiving, one by one, the N digital signals divided by each of N digital dividing means and for forming an adaptive beam, wherein L is the number of subscribers.

Preferably, the down-converting means for down-converting each of the signals which are received from the N antennas into different frequencies respectively is N antenna front-end units (AFEUs), each of which is connected to a respective antenna.

Preferably, each of the AFEUs comprises a receiver band-pass filter for receiving a signal from the antenna (230), a low noise amplifier for amplifying a signal passing through the receiver band-pass filter (240), a frequency generator (270) for generating a different frequency $f_i$(i=1 to N) to identify each AFEU (250), a receiving frequency mixer (290) for mixing the signal amplified by the low noise amplifier (240) and the signal generated by the frequency generator (270) to down-convert the mixed signal into an intermediate band frequency based upon the difference between the frequency of the amplified signal and the frequency of the signal generated by the frequency generator (270) and a frequency mixer band-pass filter (310) for filtering the signal passing through the frequency mixer into a particular passband frequency and providing the filtered signal to the combining means (330).

Preferably, the combining means for combining N signals into one signal is a N:1 power combiner (330), N signals being converted by each AFEU.

Preferably, the means for down-converting the combined signal into a base frequency band is a wide-band transceiver (340).

Preferably, the means for converting the down-converted signal into a digital signal is a wide band analog-to-digital converter (360).

Preferably, each of the N digital dividing means for dividing the converted digital signal into N different digital signals is N digital filters (410).

Preferably, the signal received from the antenna has a center of frequency of $f_{Rc}$ and a frequency band width of BW.

Preferably, the signal amplified by the low noise amplifier has a center of frequency of $f_{Rc}$, and a frequency band width of BW.

Preferably, the down-converted signal by the frequency mixer has a center of frequency of $f_{Rc}-f_i$(i=1~N) and a frequency band width of BW.

Preferably, the frequency band width of the combined signal down-converted by the wide-band transceiver does not overlap the frequency band widths of the signals from each of the N AFEUs, each signal having a frequency band width of BW.

According to another embodiment of the present invention, a transmitting apparatus for a smart antenna system of a mobile communication base station comprising L beam forming modules each having a different weight for providing N different signals from each module by multiplying a transmission signal by the respective weight, wherein L is the number of subscribers, N signal adders (390) for adding N different signals provided by each of the beam forming modules, N digital modulators (380) for up-converting the signal added by each of the signal adders into varying frequencies, respectively, a digital signal combiner (370) for combining signals modulated by the N digital modulators into a digital signal, a wide band digital-to-analog converter (350) for converting the digital signal combined by the digital signal combiner (370) into an analog signal, a wide-band transceiver (340) for up-converting in the frequency the analog signal converted by the wide band digital-to-analog converter (350), a 1:N power divider for dividing an output signal of the wide-band transceiver (340) to N signals, equally, N antenna front-end units (AFEUs) (250), each AFEU serving to convert one of the N signals divided by the 1:N power divider (320) into a transmission frequency and N array antennas (210) for transmitting a signal from each of the antenna front-end units (AFEUs).

Preferably, each of the AFEUs comprises a power divider band-pass filter (300) for filtering one of the N signals divided by the 1:N power divider (320) into a particular frequency band (300), a frequency generator (270) for generating a frequency $f_i$(i=1 to N) which is different from those of other frequency generators to identify each AFEU (270), a transmit frequency mixer (280) for mixing the signal generated by the frequency generator (270) and the signal filtered by the power divider band-pass filter (300), a high power amplifier (260) for amplifying an output signal of the frequency mixer (260) and a transmit band-pass filter (220) for receiving output signal of the high power amplifier and providing the output signal to the array antenna (210).

A signal generated by the frequency generator in each AFEU has a frequency, $f_i$(i=1 to N), differing from those of the other frequency generators.

Preferably, a signal mixed by the frequency mixer has a center of frequency identified herein as $f_{Tc}$.

A signal provided by the 1:N power divider and filtered by each band-pass filter has a center of frequency equal to $f_{Tc}-f_i$(i=1 to N).

According to another embodiment of the present invention, a transceiver arrangement for a smart antenna system of a mobile communication base station comprises N array antennas (210), N antenna front-end units (250) for down-converting signals received from the N array antennas to N different intermediate band frequencies or for up-converting N different intermediate band frequency signals into a radio transmission frequencies for transmitting, via the N antennas, a N:1 power combiner for combining the down-converted N intermediate band frequency signals into one signal, a 1:N power divider (320) for providing one of N different intermediate band frequency transmission signals to N antenna front-end units (250), respectively, a wide-band transceiver (340) for down-converting a received signal combined by the N:1 power combiner (330) into a base frequency band or for up-converting an analog transmission signal in the frequency to provide the 1:N power divider (320), a wide band analog-to-digital converter (360) for converting a received signal down-converted by the wide-band transceiver (340) into a digital signal, N digital filters (410) for dividing the converted digital signal into N different digital signals, a wide band digital-to-analog converter (350) for converting a digital transmission signal into an analog signal and for providing the analog signal to the wide-band transceiver (340), and a beam forming module (400) for forming an adaptive beam in receiving one of N digital receiving signals divided by the N digital filters in the receiving process (410) or multiplying each transmission signal by a weight and providing it with N signals divided in the transmitting process, wherein the number of beam forming module is equal to the number of subscribers.

Preferably, the transceiver arrangement of this embodiment further comprises N signal adders (390) located between the wide band digital-to-analog converter (350) and the beam forming module (400) for adding N transmission signals, each of which is provided by a beam forming module (400), N digital modulators (380) for up-converting the added signals received from each of the signal adders (390) into varying frequencies, respectively and a digital signal combiner (370) for combining signals modulated in the frequency by the N digital modulators (380) and for providing it to the wide band digital-to-analog converter (350).

Preferably, the antenna front-end unit (250) comprising a receiver band-pass filter (230) for receiving a signal from the antenna (210), a low noise amplifier (240) for amplifying a signal passing through the receive band-pass filter (230), a frequency generator (270) for generating a different frequency $f_i$(i=1 to N) to identify each AFEU (270), a receiver frequency mixer (290) for mixing the signal amplified by the low noise amplifier (240) and a signal generated by the frequency generator (290) to down-convert the mixed signal into an intermediate band frequency based upon the difference between frequency of the amplified signal and the frequency of the signal generated by the frequency generator (270), a frequency mixer band-pass filter (310) for filtering the signal passing through the receiver frequency mixer (290) into a particular passband frequency and providing the filtered signal to the combining means (330), a power divider band-pass filter (300) for filtering one of the N signals divided by the 1:N power divider (320) into a particular frequency band, a transmitter frequency mixer (280) for mixing the signal generated by the frequency generator (270) and the signal filtered by the power divider band-pass filter (300), a high power amplifier (260) for amplifying an output signal of the transmit frequency mixer (280) and a transmit band-pass filter (220) for receiving an output signal of the high power amplifier (260) and providing the signal to the array antenna (210).

Figure 2A:
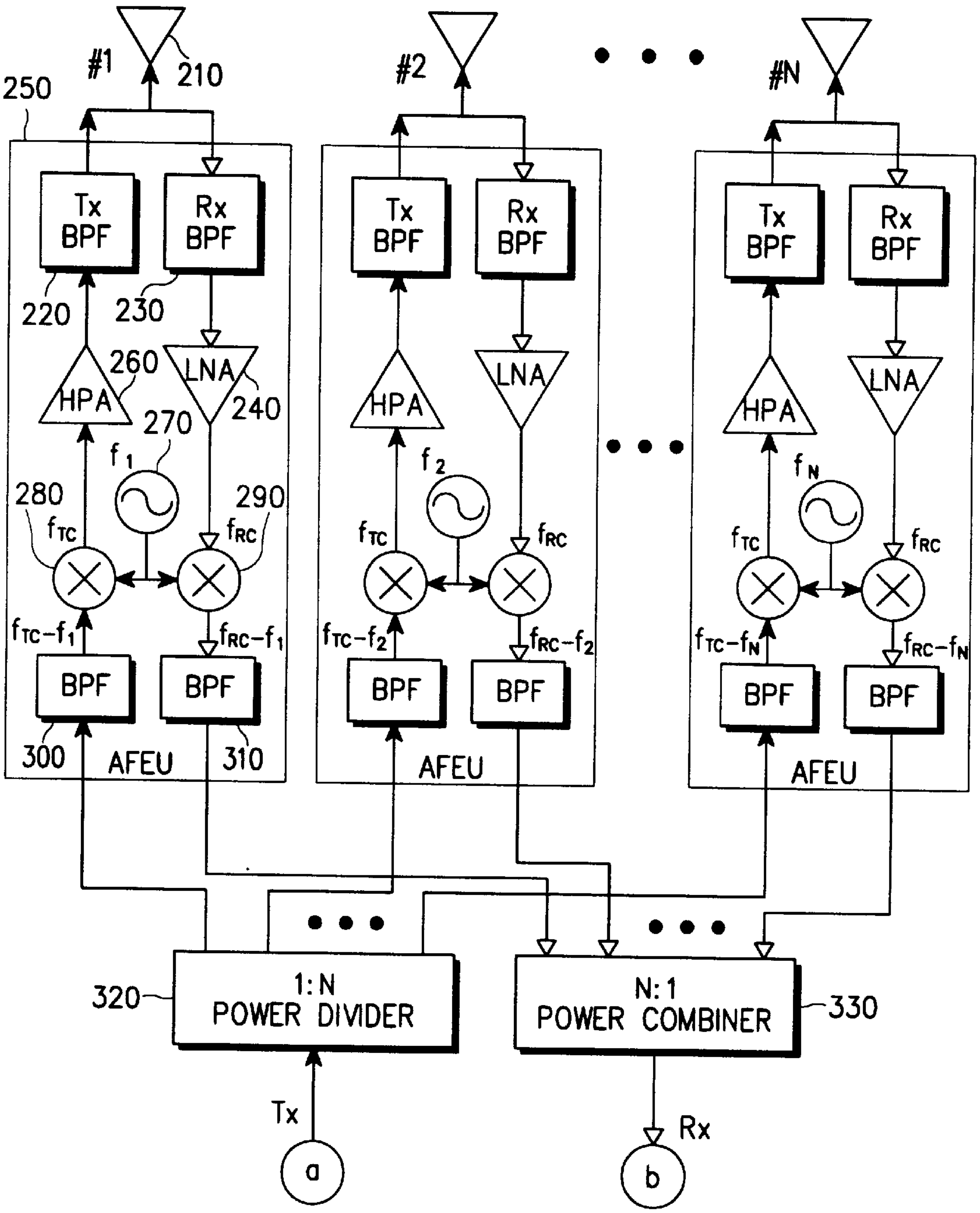
FIGS. 2*a* and 2*b* illustrate a structure of a single transceiver for a smart antenna system of a mobile communication base station in accordance with the present invention.
Figure 2B:
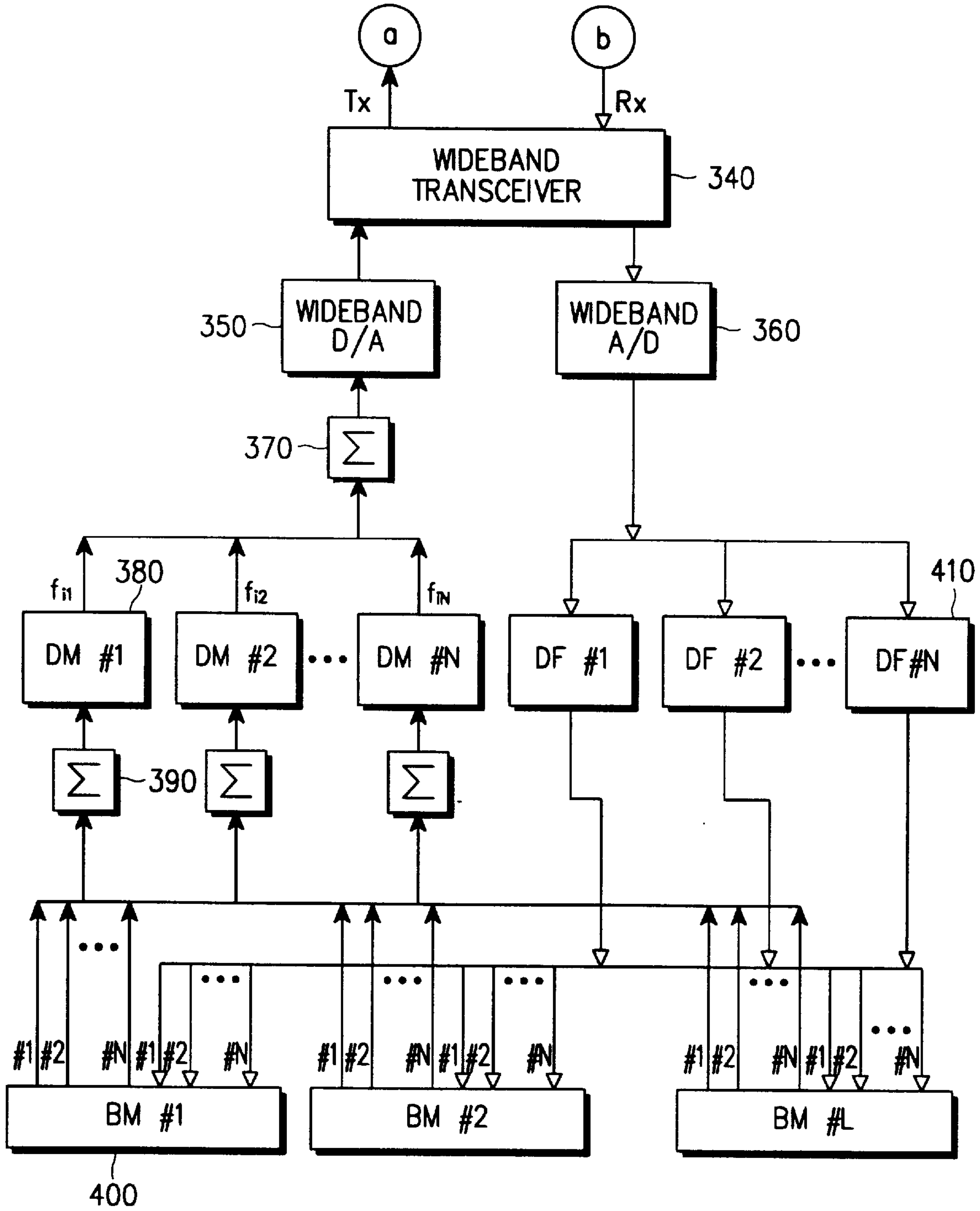

Referring now to FIG. 2, the operating principle of the present invention will be explained in further detail.

FIG. 2 illustrates the structure of a single transceiver arrangement for a smart antenna system of a mobile communication base station in accordance with the present invention. The operating principle will be explained firstly with reference to a receiving process and secondly with reference to a transmitting process, for convenience of explanation.

A Receiving Process

Signals received through N array antennas (210) have a center frequency of $f_{R_c}$ and a frequency band width of BW. The signals passing through a receiver band-pass filter (230) are each amplified by a low noise amplifier (240), being mixed with a different frequency of $f_i$(i=1 to N) generated by a frequency generator (270) of each antenna front-end unit (AFEU) (250), and being down-converted respectively to $f_{Rc}-f_1$, $f_{Rc}-f_2$, . . . , $f_{Rc}-f_N$ via a frequency mixer (290).

Output signals of the frequency mixer (290) are filtered by a frequency mixer band-pass filter (310) having each frequency band.

Signals which are received from the N array antennas respectively pass through N antenna front-end units (250), being converted into different frequencies, all being passed through a N:1 power combiner (330) and being provided to an input port of a wide-band transceiver (340).

Figure 3:
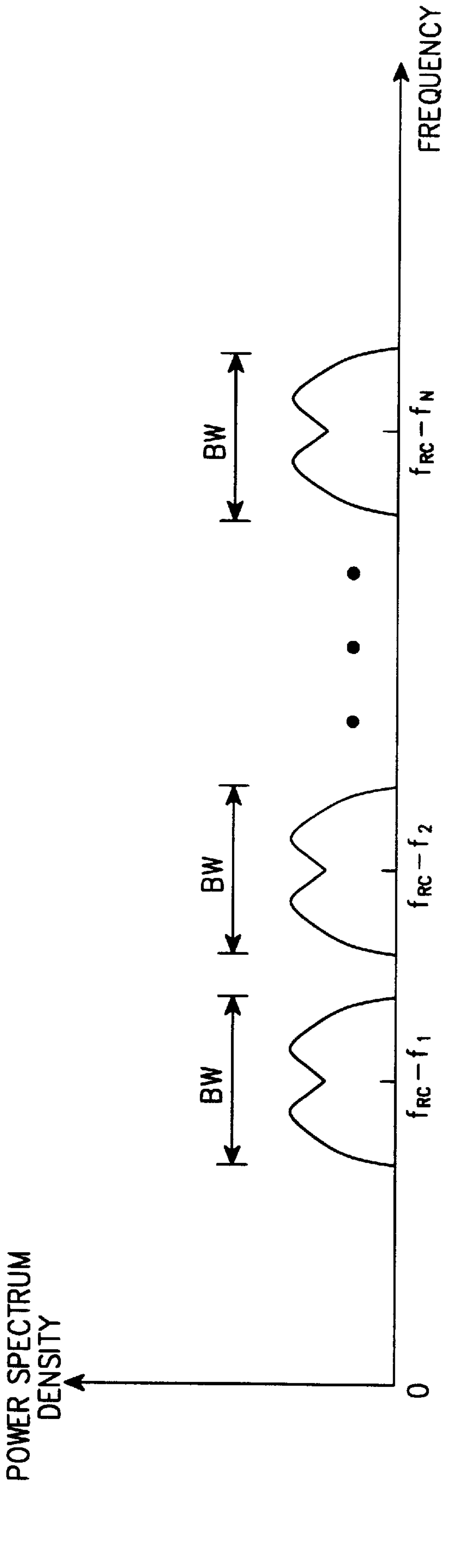
FIG. 3 illustrates a spectrum of a signal leading to a wide-band transceiver.
Figure 4:
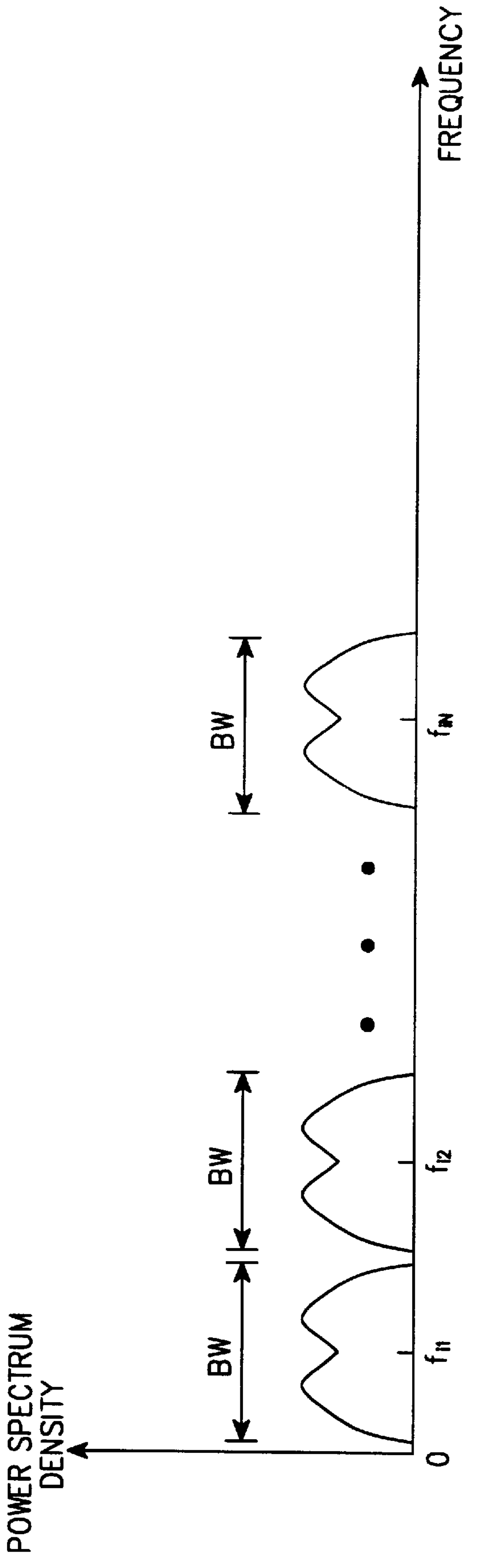
FIG. 4 illustrates a spectrum of a signal which is down-converted into a base band through a wide-band transceiver.

FIG. 3 illustrates the spectrum of a signal provided to a wide-band transceiver (340). If the signal shown in FIG. 3 passes the wide-band transceiver, being down-converted to a base band, the signal has the spectrum shown in FIG. 4. The signal which has frequencies of $f_{i1}$, $f_{i2}$, $f_{i3}$, . . . , $f_{iN}$ is converted into a digital signal by a wide band analog-to-digital converter (360) and is divided again into N signals by N digital filters (410) each of which has a main frequency of $f_{i1}$, $f_{i2}$, $f_{i3}$, . . . , $f_{iN}$, respectively. The N signals are the same as the signals which are received through the N antennas and all lead to L beam forming modules of 1 to L to form an adaptive beam for L subscribers. As will be apparent to those skilled in the art, the beam forming modules (400) forms the adaptive beam by controlling the relative phase of the N signals.

A Transmitting Process

L, which represents the number of subscribers, beam forming modules (400) have a respective different weight. Each beam forming module outputs N different signals by multiplying the respective weight and a transmission signal, each of N different signals is provided to the N signal adders (390) in front of a digital modulator (380). Each signal adder (390) adds L signals provided from each of L beam forming modules shown in FIG. 2. N signals which are from the digital modulators (380) have a frequency of $f_{i1}$, $f_{i2}$, $f_{i3}$, . . . , $f_{iN}$, respectively, are combined and are converted to an analog signal via a wide band digital-to-analog converter (350). The analog signal is provided to the input port of a wide-band transceiver (340), and is up-converted to $f_{Tc}-f_1$, $f_{Tc}-f_2$, . . . , $f_{Tc}-f_N$ via the wide-band transceiver (340), while it is divided into N signals via a power divider (320) and each signal is then provided to each antenna front-end unit (AFEU) (250). Each signal is passed through each power divider band-pass filter (300) having a main frequency of $f_{Tc}-f_1$, $f_{Tc}-f_2$, . . . , $f_{Tc}-f_N$, respectively, mixed with a signal from each of the frequency generators generating a different frequency ($f_1$ to $f_N$) corresponding to an antenna front-end unit and being up-converted to a transmission frequency of $f_{Tc}$. These signals are emitted through each array antenna.

The present invention contributes to increasing frequency efficiency and expanding capability in a mobile communication system such as CDMA_PCS, CDMA_DCS and IMT2000 (International Mobile Telecommunications for 2000). Moreover, since the present invention combines signals in accordance with FDM, which are received through N array antennas and processes them with a wide-band transceiver, it is possible to send all information from N antennas to beam forming modules at a base band and to form an adaptive beam. Furthermore, since a plurality of N transceiver arrangements required for N array antennas typically found in a prior known art are replaced with a single wide-band transceiver, a wide band analog-to-digital converter, and a wide band digital-to-analog converter, the whole system complexity, fabrication costs and power consumption is greatly reduced.

According to the present invention, a smart antenna system is operated with a single transceiver. The present invention, which uses a single transceiver instead of multiple of N transceivers, increased by N array antennas has the effect of greatly reducing the size of the whole system configuration, power consumption, and related cable and system complexity.

What is claimed:

1. A receiving apparatus for a smart antenna system for transmission/reception of frequency division multiplexed transmission and reception signals in a mobile communication base station, said apparatus comprising:

a plurality of array antennas for receiving said reception signals;

a plurality of means for down-converting each signal received from said array antennas into a different frequency, respectively;

means for combining said converted signals into one signal;

means for down-converting said combined one signal into a base frequency band;

means for converting said down-converted base frequency band signal into a digital signal;

a plurality of digital dividing means for dividing said digital signal into different digital signals; and a plurality of beam forming modules for receiving, one by one, said digital signals divided by each of said digital dividing means for forming an adaptive beam (400), wherein said down-converting means for down-converting each of the signals which are received from said array antennas into different frequencies respectively is an antenna front-end units (AFEUs), each of which is connected respectively to one of said respective antennas.

2. The receiving apparatus as set forth in claim 1, wherein each of said AFEUs comprising:

a receiver band-pass filter for receiving said reception signal from said antenna;

a low noise amplifier for amplifying said reception signal passing through said receiver band-pass filter;

a frequency generator for generating a different frequency to identify each said AFEU;

a frequency mixer for mixing said reception signal amplified by said low noise amplifier and the output signal generated by said frequency generator in order to down-convert said mixed signals into an intermediate band frequency by a difference between the frequency of the signal amplified by said low noise amplifier and the frequency of the signal generated by said frequency generator; and a receiver band-pass filter for filtering said intermediate band frequency signal passing through said frequency mixer into a particular passband frequency and providing said filtered passband frequency signal to said combining means.

3. The receiving apparatus as set forth in claim 2, wherein said down-converted signal by said frequency mixer is characterized by a center of frequency corresponding to the difference between the frequency of the signal amplified by said low noise amplifier and the frequency of the signal generated by said frequency generator.

4. The receiving apparatus as set forth in claims 1 or 2, wherein said combining means for combining said signals converted by said down-converting means into one signal is a power combiner.

5. The receiving apparatus as set forth in claim 3, wherein said means for down-converting said combined signal into a base frequency band is a wide-band transceiver.

6. The receiving apparatus as set forth in claim 5, wherein the frequency band width of the combined signal down-converted by the wide-band transceiver does not overlap the frequency band widths of the signals from each of said AFEUs.

7. The receiving apparatus as set forth in claim 5, wherein said means for converting said down-converted signal into a digital signal is a wide band analog-to-digital converter.

8. The receiving apparatus as set forth in claim 6, wherein said digital dividing means for dividing said converted digital signal into different digital signals is a plurality of digital filters.

9. A transmitting apparatus for a smart antenna system for transmission/reception of frequency division multiplexed transmission and reception signals in a mobile communication base station, said apparatus comprising:

a plurality of beam forming modules having a respective weight for providing different signals by multiplying each said transmission signal by said weight;

a plurality of signal adders for adding said different signals provided by each of said beam forming modules;

a plurality of digital modulators for up-converting said output signals added by each of said signal adders into varying frequencies, respectively;

a digital signal combiner for combining said modulated frequency by said digital modulators into a digital signal;

a wide band digital-to-analog converter for converting said digital signal combined by said digital signal combiner into an analog signal;

a wide-band transceiver for up-converting said analog signal from said wide band digital-to-analog converter;

a power divider for dividing the output signal of said wide-band transceiver into one of different intermediate band frequency transmission signal;

a plurality of antenna front-end units (AFEUs), each serving to convert one of said different transmission signals from said power divider into a transmission frequency; and a plurality of array antennas for transmitting said transmission frequency signal from each of said antenna front-end units (AFEUs).

10. The transmitting apparatus as set forth in claim 9, wherein each said AFEU comprising:

a power divider band-pass filter for filtering one of said signals divided by said power divider into a particular frequency band;

a frequency generator for generating a different frequency which is different from those of other frequency generators to identify each said AFEU;

a frequency mixer for mixing the signal generated by said frequency generator and the signal filtered by said power divider band-pass filter;

a high power amplifier for amplifying an output signal of said frequency mixer; and a transmit band-pass filter for receiving an output signal of said high power amplifier and providing the filtered signal to said array antennas.

11. The transmitting apparatus as set forth in claim 10, wherein said up-converted signal from said frequency mixer is characterized by a center frequency corresponding to the mixture of the signal filtered by said power divider band-pass filter by the signal generated by said frequency generator.

12. A transceiver arrangement for a smart antenna system for transmission/reception of frequency division multiplexed transmission and reception signals in a mobile communication base station, said transceiver arrangement comprising:

a plurality of array antennas for transmission and reception of said transmission signal and said reception signals;

a plurality of antenna front-end units capable of down-converting the signals received from said array antennas to a different intermediate band frequency and for up-converting different intermediate band frequency signals into a radio transmission frequency for transmitting via said antennas;

a power combiner for combining said down-converted intermediate band frequency signals from said antenna front-end units into one signal;

a power divider for providing one of different intermediate band frequency transmission signals to said antenna front-end units, respectively;

a wide-band transceiver coupled to said power combiner and said power divider for down-converting a receiving signal combined by said power combiner into a base frequency band and for up-converting a receiving analog signal which is then supplied to said power divider;

a wide band analog-to-digital converter coupled to said wide-band transceiver for converting the receiving signal down-converted by said wide-band transceiver into a digital signal;

a plurality of digital filters for dividing said converted digital signal from said wide band analog-to-digital converter into different digital signals;

a wide band digital-to-analog converter coupled to said wide-band transceiver for converting a digital transmission signal into an analog signal and for providing said analog signal to said wide-band transceiver; and a plurality of beam forming modules having a respective weight for forming an adaptive beam in receiving one of the digital receiving signals divided by said digital filters and for providing different signals by multiplying each transmission signal by said weight.

13. The transceiver arrangement as set forth in claim 12, further comprising:

a plurality of signal adders for adding said transmission signals each of which is provided by each said beam forming module;

a plurality of digital modulators for up-converting said transmission signal added by each of said signal adders into varying frequencies, respectively; and a digital signal combiner for combining said different signals modulated frequency by said digital modulators into a digital signal and for transmitting the combined signal to said wide band digital-to-analog converter.

14. The transceiver arrangement as set forth in claim 13, wherein said antenna front-end unit comprising:

a receiver band-pass filter for receiving a signal from said antenna;

a low noise amplifier for amplifying the signal passing through said receiver band-pass filter;

a frequency generator for generating a different frequency to identify each AFEU;

a first frequency mixer for mixing said signal amplified by said low noise amplifier and the signal generated by said frequency generator to down-convert said mixed signal into an intermediate band frequency by a difference between the frequency of said amplified signal and the frequency of said signal generated by said frequency generator;

a first band-pass filter for filtering said signal passing through said first frequency mixer into a particular passband frequency and providing said filtered signal to said power combiner;

a second band-pass filter for filtering one of said signals divided by said power divider into a particular frequency band;

a second frequency mixer for mixing the output signal generated by said second frequency generator and the output signal filtered by said second band-pass filter;

a high power amplifier for amplifying the output signal of said frequency mixer; and a transmit band-pass filter for receiving the output signal of said high power amplifier and providing the filtered signal to said array antenna.

* * * * *